Figure 1:
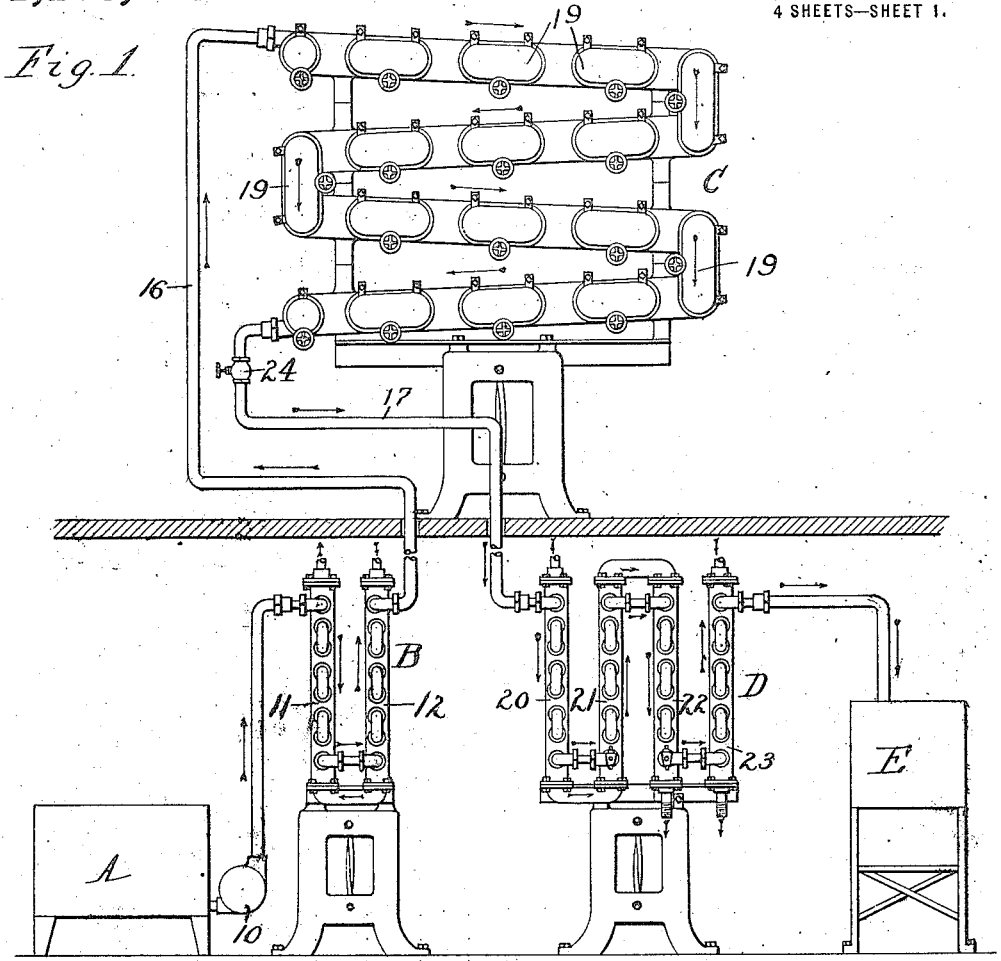

H. FELDMEIER & C. B. DALZELL.
METHOD OF PASTEURIZING MILK.
APPLICATION FILED JUNE 9, 1911.

1,138,097.

Patented May 4, 1915.

4 SHEETS—SHEET 1.

Witnesses:—
A. Bakenhagen.
C. C. Easterbrooks.

Inventors
Harvey Feldmeier,
Charles B. Dalzell,
By Wilhelm, Parker & Hart,
Attorneys.

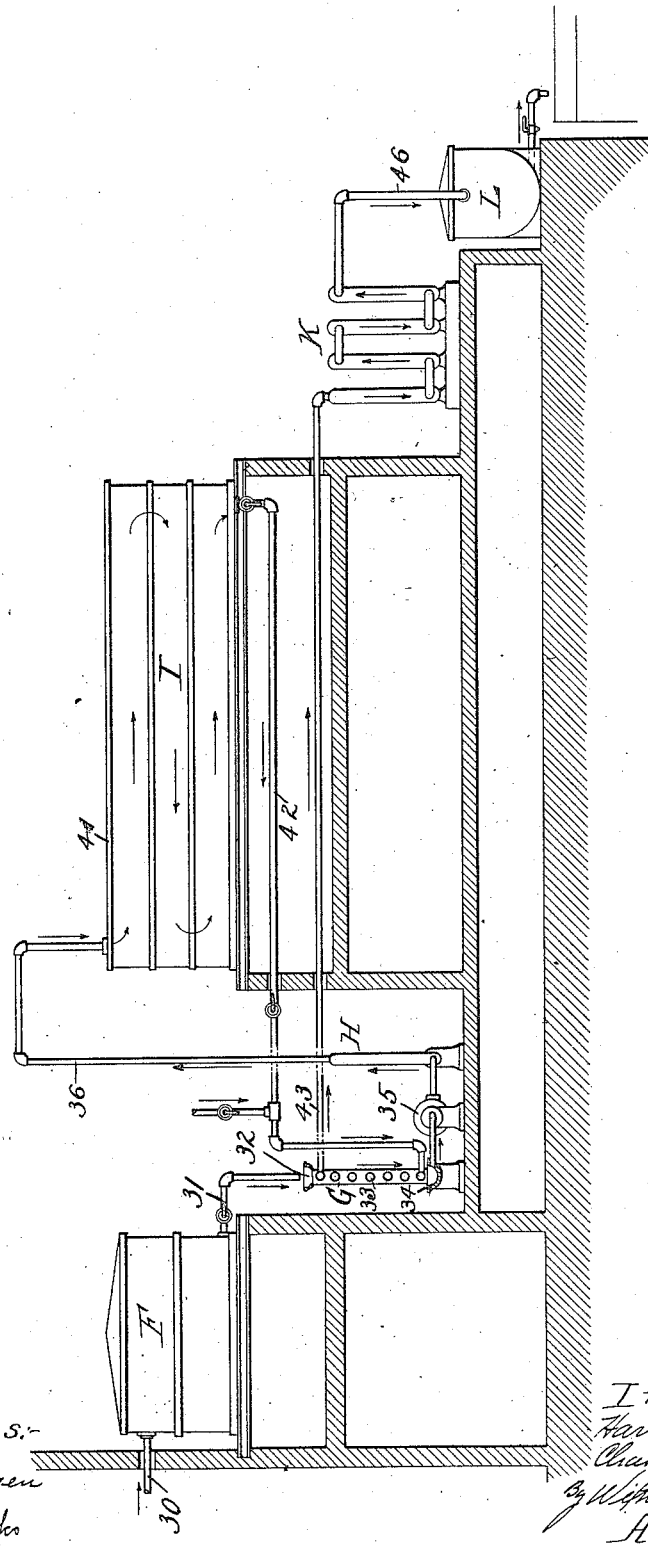

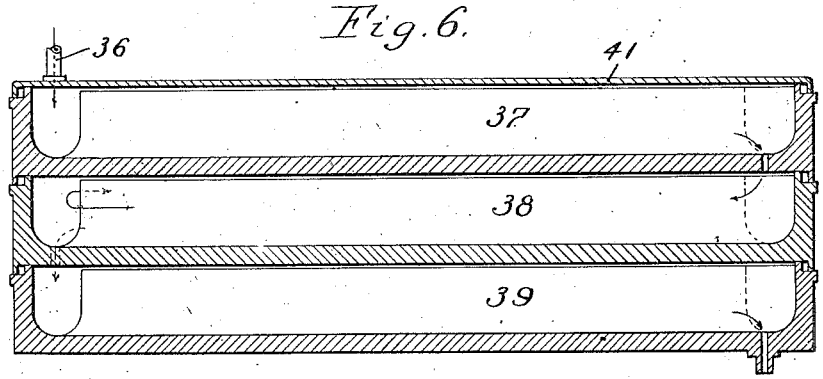
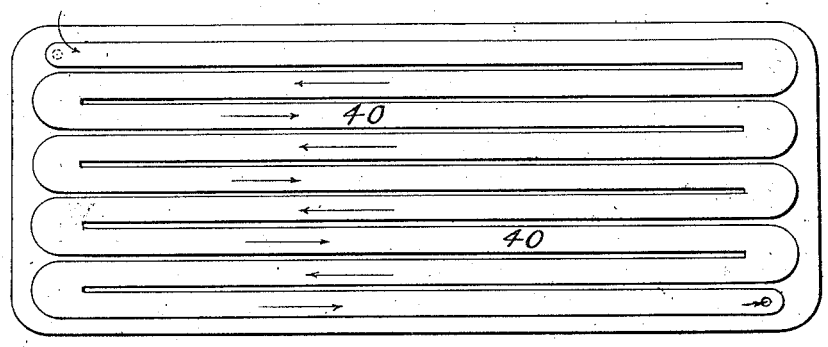
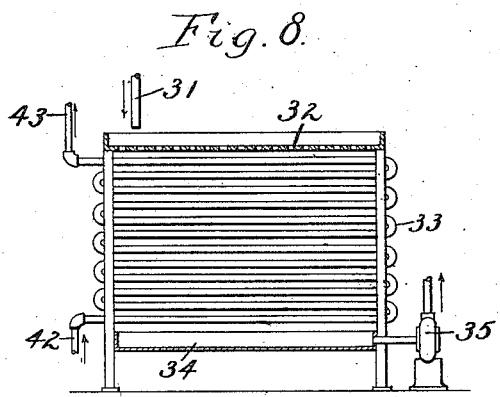

UNITED STATES PATENT OFFICE.

HARVEY FELDMEIER AND CHARLES B. DALZELL, OF LITTLE FALLS, NEW YORK, ASSIGNORS TO D. H. BURRELL & COMPANY, OF LITTLE FALLS, NEW YORK.

METHOD OF PASTEURIZING MILK.

1,138,097.     Specification of Letters Patent.     Patented May 4, 1915.

Application filed June 9, 1911. Serial No. 632,127.

*To all whom it may concern:*

Be it known that we, HARVEY FELDMEIER and CHARLES B. DALZELL, citizens of the United States, residing at Little Falls, in the county of Herkimer and State of New York, have invented a new and useful Improvement in Methods of Pasteurizing Milk, of which the following is a specification.

This invention relates to the pasteurization of milk and other liquids by first heating the liquid to the temperature necessary for pasteurization, in the case of milk usually from 140° to 150° F., then holding the liquids at this temperature for a sufficient length of time to produce the desired effect, usually from 20 to 30 minutes, and then cooling the liquid to the temperature suitable for filling the same in bottles or other vessels or containers, usually about 40° F.

Heretofore in pasteurizing milk the holding of the milk at the pasteurizing temperature has been effected in various ways which permitted the milk to pass through the heater and the cooler without interrupting the flow through these parts of the apparatus, but in all of these known methods the holding is effected in such a way that the milk comes to a state of rest, either wholly or in part, as for instance, by causing the heated milk to collect in a vat or tank in which the milk remains to a greater or less extent during the pasteurizing period, or by causing the milk to collect in compartments which are successively filled and emptied.

The object of this invention is to provide a simple method of holding the heated milk or other liquid for the desired length of time in such manner that all particles of the heated liquid are held practically for the same length of time, so that no part of the liquid is allowed to escape before that period has expired or is held beyond that period, and without allowing any portion of the liquid to come to a state of rest. To that end the heated liquid is caused to flow through a holder formed by a sinuous passage, coil or tube in which the liquid is confined in the form of a uniformly flowing stream, and the velocity of the flow is so regulated that the speed of the liquid in flowing through the holder occupies the length of time during which the liquid is required to be held at the pasteurizing temperature and does not drop below a minimum speed which is sufficient to cause the maintenance of a moving stream in which all particles move forwardly with the same speed and in which, therefore, neither eddies, counter currents or stagnant bodies are formed which would retard the movement of the liquid, nor accelerated secondary currents which would cause part of the liquid to flow through the holder in less time than the desired period.

The accompanying drawings, consisting of four sheets, represent two different styles of apparatus by which the method can be practised. In the apparatus represented in Figures 1–4, which is preferred, a tubular holder is employed, while in the apparatus represented in Figs. 5–8 the holder is composed of three superposed sections, each having a flow passage having the form of a sinuous channel.

Figure 2:
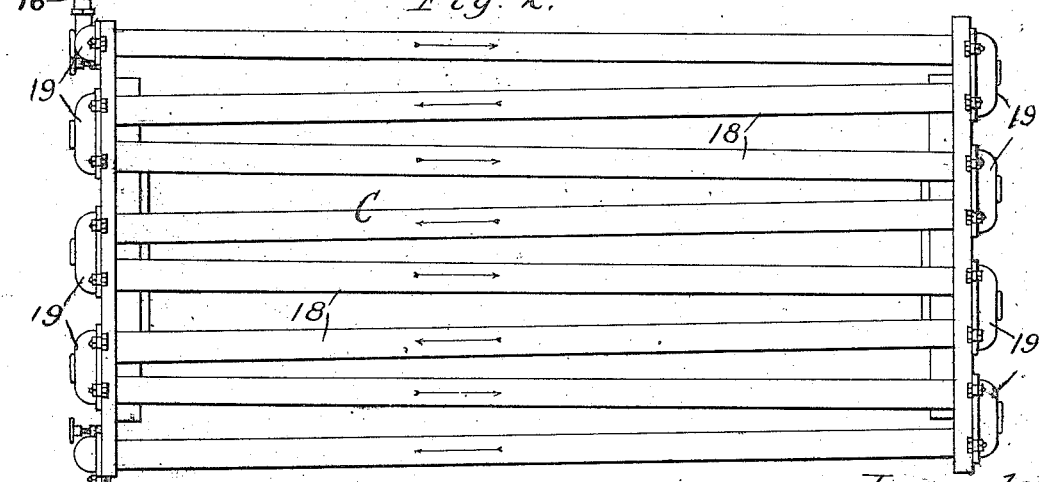
Figure 3:
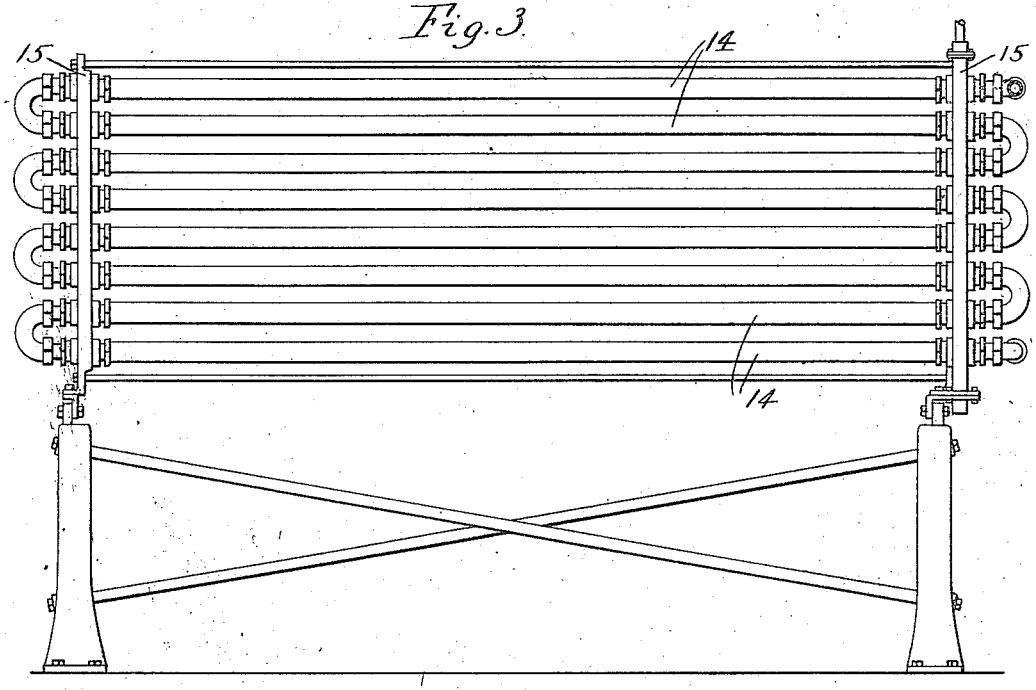
Figure 4:
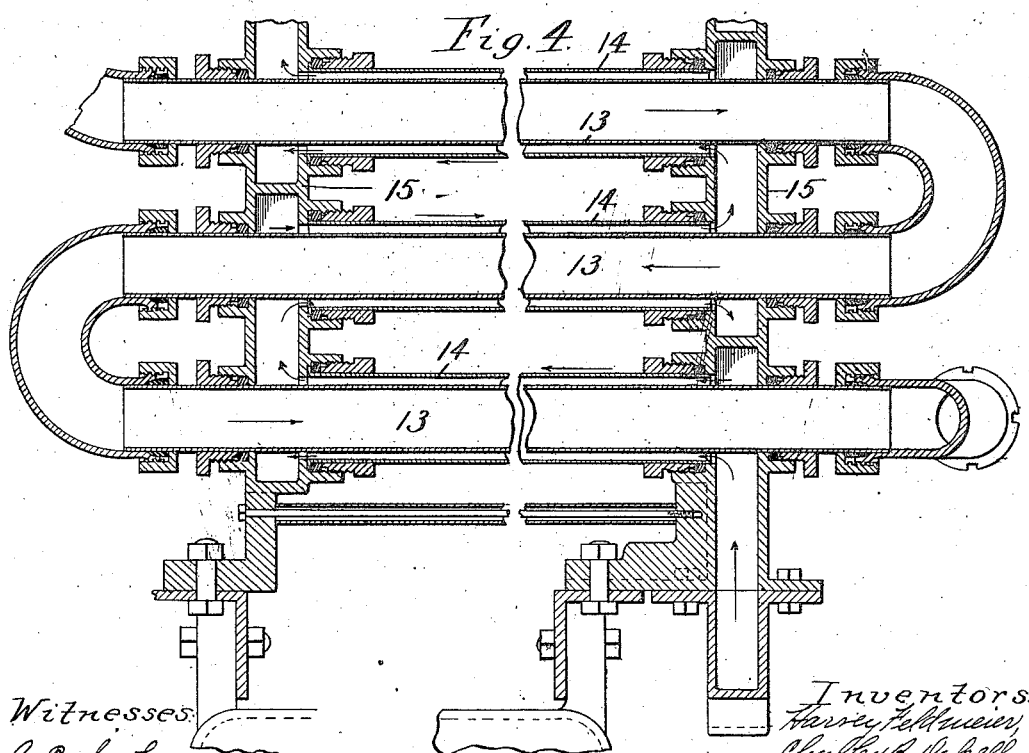

Fig. 1 is a diagrammatic elevation of a pasteurizing apparatus comprising a tubular holder. Fig. 2 is a top plan view of the holder. Fig. 3 is a side elevation of the cooler. Fig. 4 is a fragmentary vertical section of the heater or cooler, on an enlarged scale. Fig. 5 is a diagrammatic sectional elevation of a pasteurizing apparatus comprising a channel holder. Fig. 6 is a vertical longitudinal section of the channel holder. Fig. 7 is a top plan view of the same with the cover removed. Fig. 8 is an elevation of the preliminary heater and aerator of this apparatus.

Like reference characters refer to like parts in the several figures.

Each apparatus is herein described as being used for treating milk.

Referring to Figs. 1–4, A represents the receptacle or tank for the milk to be pasteurized, from which the milk is supplied by a pump 10 or other suitable means to the heater B which may be composed of two sections 11 and 12 which are arranged side by side and through which the milk flows successively. This heater is preferably composed of connected internal tubes 13 through which the milk flows and outer tubes 14 which surround the internal tubes and which are connected with headers 15 having flow spaces by which adjacent external tubes communicate in such manner that the heating liquid, which may be hot water, flows through the annular passages between the internal and outer tubes and the flow passages in the headers in the opposite direction to the flow of the milk. C represents the tubular holder or holding coil which receives the heated milk, preferably at its upper end, from the heater B by a pipe 16 and from which the milk escapes at the lower end by a pipe 17. The holder consists of a coil or sinuous tube system arranged preferably in several sections, one above the other, and composed preferably of nearly parallel pipes 18 connected by return bends 19, the plane of each section being inclined to facilitate draining. The pipes or tubes of this coil are considerably larger in diameter than the milk pipe of the heater, so that the velocity of flow is considerably less in the holder than in the heater. An internal diameter of about 1¾ inches is suitable for the milk flow pipe of the heater and an internal diameter of 5¾ inches is suitable for the holder.

It has been found in practice that a speed of not less than eight feet per minute in the holder causes the milk to flow through the same in a solid stream or moving body in which all particles of the milk flow forwardly with practically the same speed, so that neither eddies, cross currents or stagnant bodies nor accelerated secondary currents are formed and all of the liquid particles consume practically the same time in passing from the inlet to the outlet of the holder. If the speed is too slow the outermost portions of the liquid are greatly retarded and accelerated secondary currents are formed in the inner portion of the liquid which travel at a much greater speed than the rest of the liquid and reach the outlet in much less time, so that the liquid which forms these accelerated currents is not held at the pasteurizing temperature for the desired length of time, while other portions of the liquid are held much longer than the desired period, whereby a uniform action of the heat on the liquid is rendered impossible and the successful operation of the apparatus is defeated. The holder is made of such length that the milk occupies the desired period of time in passing from the inlet to the outlet of the holder. For illustration, if it is desired to hold the milk for thirty minutes and the speed of the milk in the flow passage of the holder is twelve feet per minute, the length of the passage should be three hundred and sixty feet. The speed of the flow through the heater and the cooler is proportionately greater, which is desirable as it promotes the exchange of heat between the milk and the heating or cooling medium, while reducing the size of the apparatus.

In an apparatus having the preferred proportions herein shown and described and at a speed of about eight feet per minute in the holder, the speed of the milk through the heater will be about 128 feet per minute or about 16 times the speed through the holder. The time occupied by the milk in passing through the heater would be in practice about one minute and a quarter and the time occupied by the milk in passing through the holder will be about twenty minutes. The small diameter of the heating pipes enables the milk to absorb heat more quickly from a heating medium of a given temperature than if larger pipes were used, while on the other hand the relatively large diameter of the holder pipes favors the holding of the milk at the pasteurizing temperature without material loss of heat while flowing through the holder. By the use of the pipes of relatively small diameter in the heater it is possible to heat the milk to the pasteurizing temperature quickly as compared with the time during which the milk is retained at the pasteurizing temperature in the holder. This is desirable because in being heated from about 45° F. to about 145° F. the milk passes through a range of temperature which is most favorable to the propagation of bacteria, which range is from about 70° F. to 103° F. The quicker the milk passes through this range of temperature the less chance there is for the propagation of bacteria during the heating process.

D represents the cooler to which the milk passes from the holder through the pipe 17 and in which the milk is cooled to the temperature suitable for bottling or storing. This cooler is constructed preferably like the heater of connected internal tubes and outer tubes connected by headers and is arranged in several sections 20, 21, 22, 23, side by side, some of which may be cooled by ice water and others by brine. The milk passes from the last section 23 to a suitable receiving tank E which may be the tank of the bottle filler.

In the operation of this apparatus the cold milk, having a temperature of about 60° F., is heated in flowing through the heater B to the desired pasteurizing temperature, usually from 140° to 150° F., and passes with this temperature to and through the tubular holder in which this temperature is practically maintained while the milk flows through the holder, the milk losing but a few degrees in temperature as the holder is suitably insulated or protected against loss of heat. In starting the apparatus the discharge cock 24 at the tail end of the holding coil is kept closed until the holder has been filled and the milk is supplied to the coil with such speed that in filling the coil the period of time is occupied which is required for pasteurization, say thirty minutes. When the holder is full the discharge cock is opened and thereafter the milk flows through the holder with such speed that each milk particle occupies the desired holding period in flowing from the inlet to the outlet of the holding coil. The time during which the milk is required to be held at the pasteurizing temperature varies somewhat with the temperature which is employed. For illustration, with a temperature of 140° F. a holding period of thirty minutes is suitable, while with a temperature of 150° F a period of twenty-five minutes is sufficient. The milk is kept in motion while passing through all parts of the apparatus, thereby avoiding a partial separation of the cream and the formation of foam, which are liable to take place when the milk is allowed to come to a state of rest. Furthermore, the coating of the pipes is avoided and the milk is thoroughly and uniformly acted upon. The milk can be forced through the entire apparatus, heater, holder and cooler, by a single pump or by gravity, since all of these parts form a single tubular passage through which the milk flows without interruption or coming to a state of rest and through which the milk can be caused to flow at a predetermined speed. The apparatus is simple and efficient and contains no moving parts. If desired, all of the parts of the apparatus may be arranged on the same level.

The apparatus represented in Figs. 5–8 is constructed as follows: F represents the receptacle to which the milk is supplied by a pipe 30, or otherwise, and from which the milk is drawn by a pipe 31. G represents a preliminary heater and aerator which comprises a horizontal feed trough 32, a heating and aerating coil 33 arranged beneath the same and a receiving trough 34 below the coil. The milk passes from the pipe 31 into the receiving trough 32, flows from the latter upon the upper part of the aerating and heating coil 33, descends on the outer side of the coil in a film or thin sheet and in doing so becomes heated to a certain extent and gives off its odors, vapors or gases and collects in the lower trough 34. H represents the final heater which receives the milk from the trough 34 and which completes the heating of the milk to the pasteurizing temperature. 35 represents a pump which is employed, if necessary, for removing the milk from the trough 34 and forcing it through this heater. The latter consists preferably of an inner coil or pipe through which the milk flows and outer or surrounding tubes or passages to which steam or hot water is supplied. I represents the holder which receives the heated milk from the final heater H by a pipe 36 and which comprises a flow passage for the milk of such length that the milk in passing through the same occupies the period of time which is necessary for effecting the pasteurization, without, however, allowing the milk to come to a state of rest. This holder consists preferably of three superposed horizontal sections 37, 38 and 39, each having in its upper side an open-topped sinuous trough or flow passage 40 and each upper section discharging the milk from the delivery end of its trough or passage into the receiving end of the next lower section. The top section is closed by a cover 41 and each upper section forms a cover for the section next below. The milk flows from the discharge end of the holder I through a pipe 42 to the lower end of the coil 33 of the preliminary heater and aerator G, flows upwardly through said coil and escapes from the upper end thereof through a pipe 43 through which the milk flows to the cooler K. In passing through the coil 33 the hot milk gives off part of its heat to the cold milk which flows downwardly over the outer side of the coil, and this heat is so recovered and utilized for partially heating the incoming cold milk, while the hot milk is partially cooled by this regenerating operation. The cooler K consists preferably of an inner coil or pipe through which the milk flows, and outer or inclosing tubes or pipes through which the cooling medium flows. L represents the storage tank or vat which receives the pasteurized milk by a pipe 46 and in which the milk is stored until it is bottled or otherwise disposed of.

In the operation of this apparatus the milk is first heated in a film or thin sheet, while exposed to the air, whereby objectionable odors, vapors and gases are driven off; and the milk is then heated in the final heater, held at the temperature so produced while flowing through the channel holder, and cooled in passing through the cooler, and the treatment of the milk with the exception of the preliminary heating and aerating takes place while the milk flows through a closed passage, whereby the milk is prevented from absorbing again odors, vapors, germs or bacteria from the surrounding air. In referring herein to milk we intend to include also other similar liquids, for instance, cream, skimmilk, buttermilk, &c. The process can also be employed for the pasteurization or sterilization of other liquids, for instance, beer or water.

The tubular holder first described is preferred for several reasons as it is simpler and stronger than the channel holder and can be drained without difficulty, and because it forms with the heater and cooler a continuous liquid-tight passage through which the liquid can be forced by a pump or by gravity. The milk or other liquid flows through the channel holder in a solid moving body or stream in which all particles move forwardly practically with the same speed, and in that respect there is no substantial difference between the channel holder and the tubular holder. Either apparatus may be provided with the regenerating means disclosed by Patent No. 972,608, October 11, 1910.

We claim as our invention:

1. In the process of pasteurization, the herein described steps which consist in heating the liquid to the pasteurizing temperature by subjecting the liquid while flowing in a continuous stream to the influence of a heating medium, then removing the liquid from the influence of such medium and holding the liquid at the pasteurizing temperature for the required period of time while flowing in a confined and continuous stream, and then cooling the liquid while flowing in a continuous stream, substantially as set forth.

2. In the process of pasteurization, the herein described steps which consist in heating the liquid to the pasteurizing temperature by subjecting the liquid to the influence of a heating medium; then removing the liquid from the influence of such medium and holding the liquid practically at the pasteurizing temperature for the required period of time while flowing in a confined stream with a speed which causes all liquid particles to move forwardly with practically the same speed throughout the cross sectional area of the flowing stream, substantially as set forth.

3. In the process of pasteurizing milk, the herein described steps which consist in heating the milk to the pasteurizing temperature by subjecting the milk to the influence of a heating medium while flowing in a continuous stream, then removing the milk from the influence of such medium and holding the milk at the pasteurizing temperature for the required length of time while flowing in a confined and continuous stream at a speed which is greatly reduced as compared with the speed of the milk while it is being heated, and then cooling the milk while flowing in a continuous stream.

4. In the process of pasteurizing milk, the herein described steps which consist in heating the milk to the pasteurizing temperature by subjecting the milk to the influence of a heating medium while flowing relatively rapidly in a continuous stream having a relatively small cross-sectional area, then removing the milk from the influence of such heating medium and holding the milk at the pasteurizing temperature for the required length of time while flowing in a confined and continuous stream of relatively large cross-sectional area, and then cooling the milk while flowing in a continuous stream.

5. The herein described process of pasteurizing milk which consists in heating the milk to the pasteurizing temperature by subjecting it to the action of a heating medium while flowing at a relatively high speed in a stream of relatively small cross-sectional area, then removing the milk from the influence of said medium and holding it at the pasteurizing temperature while flowing in a continuous stream of relatively large cross-sectional area at a greatly reduced speed, and then cooling the milk while flowing in a continuous stream.

Witness our hands in the presence of two subscribing witnesses.

HARVEY FELDMEIER.
CHARLES B. DALZELL.

Witnesses:
GRIFFITH PRICHARD,
CELIA WOODARD.